Feb. 22, 1966  G. CRANSKENS  3,236,546
SOCKET TUBE COUPLING
Filed Jan. 16, 1963
FIG. 1
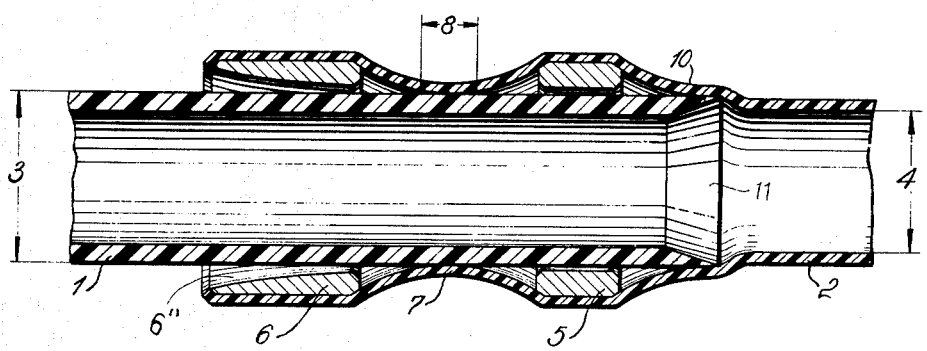
FIG. 2
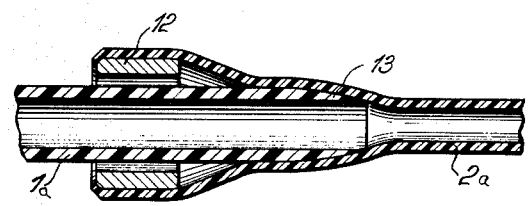
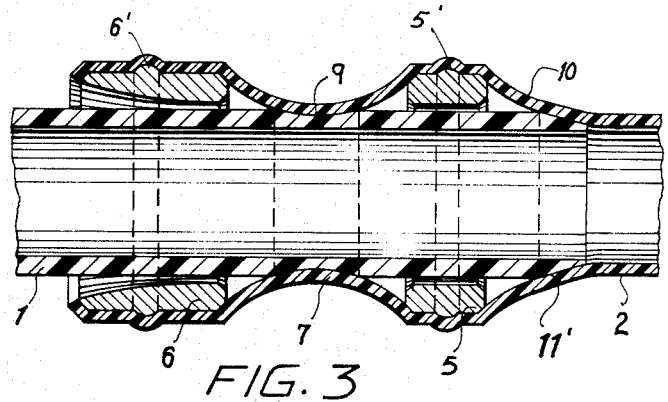
FIG. 3
GEORG CRANSKENS
INVENTOR
AGENT

United States Patent Office 3,236,546
Patented Feb. 22, 1966

3,236,546
SOCKET TUBE COUPLING
Georg Cranskens, Wedel, Holstein, Germany, assignor to Lumoprint Zindler K.G., Hamburg, Germany, a corporation of Germany
Filed Jan. 16, 1963, Ser. No. 251,907
Claims priority, application Germany, Jan. 24, 1962, L 41,039
3 Claims. (Cl. 285—238)

The present invention relates to a socket coupling between an elastic tube and a pipe portion adapted to be telescoped one into the other, the internal diameter of the elastic tube being smaller than the external diameter of the pipe portion.

Such socket couplings are utilized, for example, in photographic printing instruments to which storage reservoirs are coupled by means of connecting conduits. They also occur in household machines such as washing machines and the like.

It is known, for an elastic tube, to be so constructed as to be slidable onto the pipe portion with a certain amount of effort. However, this solution is cumbersome because it entails a relatively large expenditure of time and effort, the tube has to be produced with a certain undersize and, for fitting purposes, instruments must be employed to spread the outer member. When the above method is employed, the coupling approximates a flared junction rather than a socket coupling and the tube has to be comparatively resilient or else it cannot be fitted.

It is also known to provide either the tube or the pipe portion with a conical orifice whose conical surface depends upon the dimensions of the parts to be coupled together and is provided interiorly or exteriorly. This arrangement, however, does not afford a reliable connection since there is only a comparatively short outer section available and the elasticity of the latter in the region of the tube is reduced, resulting in a lesser contractible force as a consequence of the reduced wall thickness with concurrent risk of more rapid material fatigue.

In order to provide uniform wall thickness along the flared section it would be necessary to utilize specially manufactured tube sections, a method which is undesirable and disadvantageous. Moreover, such conical socket couplings have the characteristic that the surfaces to be mutually sealed are axially slid into abutting relationship with one another and clamped together with a wedging action whereby it may occur that pressure of foreign matter prevents the formation of a perfect seal. Furthermore, there is the disadvantage that socket couplings of this type are readily disengaged and that, once the elastic (e.g. rubber) tube hardens, as is generally the case, a satisfactory seal is no longer possible.

The principal object of the present invention is to obviate these disadvantages by providing an improved method of forming a socket coupling.

Another object of my invention is to provide a relatively inexpensive and effective coupling of this type.

According to the present invention, a funnel-like enlargement is provided at the orifice of the tube with elastic wall portions over the entire funnel-like section by disposing therein, at least at the orifice, a rigid expansion ring having a larger internal diameter than the external diameter of the pipe section which is adapted to be passed through this orifice and has a sealing surface abuttingly engageable with the resilient section lying axially beyond the ring.

Such a construction, on the one hand, permits the flared resilient tube section to be spaced from the orifice and be protected by the expansion ring so that the risk of contamination is substantially reduced. Moreover, the funnel-like form has curved wall portions with a radius of curvature which decreases progressively axially in the direction of the ring. Thus, a cylindrical pipe portion can be introduced to a certain extent into the neck of the funnel while enlarging the tube, the latter being readily held in the region at which the rigid expansion ring is situated. This arrangement permits ready manipulation and formation of a sealing surface as at least one part of the tube is supported over a certain peripheral region of the pipe portion.

In accordance with a preferred feature of the invention, however, a double sealing effect is provided adjacent the orifice and axially spaced therefrom over a substantially cylindrical part of the pipe portion with sealing pressure exerted exclusively in a radial direction and acting upon the latter part of the pipe section.

This is advantageously obtained, in accordance with the present invention, by providing a second rigid ring having a larger diameter than the external diameter of the pipe portion axially spaced inwardly of the first ring in the interior of the tube so that the flexibly resilient tube section between the rings, by virtue of its contractible force, reduces its own diameter until it becomes smaller than the diameter of the pipe section, thus causing it to bear against the pipe portion and peripherally seal the latter to the tube.

With correct selection of the spacing for the expansion rings, according to the properties of the tube material, it is possible to maintain a condition in which, on the one hand, the pipe portion may be passed through the tube section with relatively little force and, on the other hand, a pressure region of considerable axial extent is provided along which sealing engagement occurs. In this case the tube section, through which the pipe portion is passed adjacent the orifice ring, is substantially flared whereby the introduction of the pipe section is considerably facilitated. The section between the rings incidentally affords self-cleaning of the orifice region of the pipe portion by scraping off any foreign matter. The presence of the latter has, however, no adverse effect since pressure in this region acts exclusively in a radial direction on the cylindrical pipe portion over a considerable axial length.

The elastomeric tube may be composed, for example, of rubber, rubber substitute or synthetic resin (e.g. an ethyleneglycol adipinic-acid polyester known by the trade name "Vulcollan"). The pipe portion may be composed of a rigid material, possibly metal or a synthetic resin such as a soft polyvinyl chloride. A particular advantage results also when the pipe portion consists of a somewhat elastic material having a resiliency less than that of the tube.

The present invention will be described hereinafter in greater detail, reference being made to the accompanying drawing in which:

FIG. 1 is an axial cross-sectional view of an embodiment of the invention;

FIG. 2 is a similar view of another embodiment of the invention; and

FIG. 3 is a view similar to FIG. 1 illustrating a modification.

In the coupling shown in FIG. 1 a pipe portion 1, e.g. of polyvinyl chloride, is coupled with a tube 2 so as to be liquid tight. The external diameter 3 of pipe portion 1 is greater than the internal diameter 4 of tube 2. The latter is enlarged on two locations, which are axially spaced apart, by two rings 5 and 6. Each of these rings has an internal diameter greater than the external diameter 3 of pipe portion 1. The rings are of rigid material and externally provided with peripheral annular formations or profiles 5', 6' to insure their mounting in tube 2. Ring 6 is situated directly at the orifice of tube 2 and is flared internally at 6" in the direction of the orifice in order to facilitate the insertion of the pipe portion (see FIG. 3).

Rings 5 and 6, taking into consideration the wall thickness and the elasticity of tube 2, are so dimensioned and arranged in axially spaced relationship that tube 2, in a section 7 intermediate the rings, tends to return to its original caliber and has an internal diameter smaller than the external diameter 3 of pipe portion 1. In this section, therefore, tube 2 abuts the cylindrical pipe with a peripheral seal over an axial length which is designated by numeral 8. In this region it is possible to obtain an elongated sealing action owing to the shape of the tube in the section between the rings. The partial expansion or prestressing of the wall of tube 2 in section 7 and the fact that the latter has a progressively decreasing radius of curvature from an intermediate point toward the ring 6 permit the pipe portion 1 to be readily inserted.

It is furthermore within the scope of the instant invention to provide on the external circumference of the pipe, preferably in the portion situated in the region of section 7, one or more circumferential profiles one of which, for example, is indicated at 9 (FIG. 3) as a peripheral groove of curved cross-section, into which profiles tube section 7 is caused to fit snugly with a concurrent strengthening of the grip. It is evident that pipe portion 1 passes with its front end through the inner expansion ring 5 and, at 10, enlarges the wall of tube 2 so that the latter is sealingly supported directly against the orifice of pipe portion 1. This arrangement causes two sealing regions to be provided which not only insure a firmer grip but also considerably increase the reliability of the seal over a long period.

It is preferable to have a cylindrical construction of the pipe portion 1 up to the orifice because in so doing the incidence of forces tending to push back the pipe section is considerably reduced. However, it is possible, for example, for the pipe section to be internally conically enlarged, as indicated at 11, in order to obtain a smooth transition between the interior spaces of the pipe portion and of the tube. Furthermore, in a modified construction, pipe portion 1 may be externally beveled at its orifice as indicated by line 11 in FIG. 3. The satisfactory gripping is thereby considerably improved, as the elastic tube lies symmetrically relatively to a transverse plane in the center of section 7 so that, in this case, support is obtained with forces which have no net axially effective component. Moreover, the pipe portion is cleaned at its orifice during insertion by scraping off any foreign matter.

A modified embodiment is shown in FIG. 2. Here pipe member 1a is coupled to an elastic tube member 2a which has only one expansion ring 12 in the region of its orifice. The pipe portion 1a has a conical bevel 13 on its external surface.

The expansion ring 12 provides an inwardly precurved funnel-like wall of tube 2 which affords a particularly long seal between tube and pipe section and, hence, a relatively firm sealing engagement. It should be noted that bevel 13 is so chosen that the tube is also in sealing engagement with part of the cylindrical pipe portion whereby, even in combination with the relatively slight and therefore self-braking bevel 13, a mechanically firm coupling can be realized.

I claim:
1. A pipe connection comprising a resilient flexible tube with a terminal portion forming a socket member, a rigid pipe member having an external diameter greater than the internal diameter of said tube in a relaxed state of the latter, a rigid first ring of internal diameter greater than said external diameter coaxially received in said tube at an end of said socket member, a rigid second ring of internal diameter greater than said external diameter received in said socket member and axially spaced from said first ring, said socket member having a constricted wall portion intermediate said rings peripherally contacting said pipe member along a first zone, thereby securing said members to each other and forming a first seal therebetween, said socket member converging beyond said second ring and peripherally contacting said pipe member along a second zone beyond said second ring, thereby additionally securing said members to each other and forming a second seal therebetween.

2. A pipe connection as defined in claim 1 wherein said pipe member is provided with a peripheral formation engageable with said wall portion intermediate said rings.

3. A pipe connection as defined in claim 2 wherein said formation is a circumferential peripheral groove having an arcuate axial cross-section.

References Cited by the Examiner

UNITED STATES PATENTS

| 2,264,815 | 12/1941 | Thomson | 285—239 |
| 2,498,357 | 2/1950 | Breisch | 29—450 |
| 2,498,831 | 2/1950 | Veitch | 285—260 X |
| 2,739,829 | 3/1956 | Pedlow et al. | |
| 3,129,020 | 4/1964 | Bujnowski | 285—260 X |

FOREIGN PATENTS

| 524,849 | 12/1953 | Belgium. |
| 773,033 | 4/1957 | Great Britain. |
| 87,734 | 3/1958 | Netherlands. |
| 278,090 | 1/1952 | Switzerland. |

EDWARD C. ALLEN, *Primary Examiner.*

THOMAS F. CALLAGHAN, CARL W. TOMLIN,
*Examiners.*